D. P. KELLOGG & C. M. ECKLAND.
BOLT.
APPLICATION FILED SEPT. 4, 1915.
1,207,562.
Patented Dec. 5, 1916.
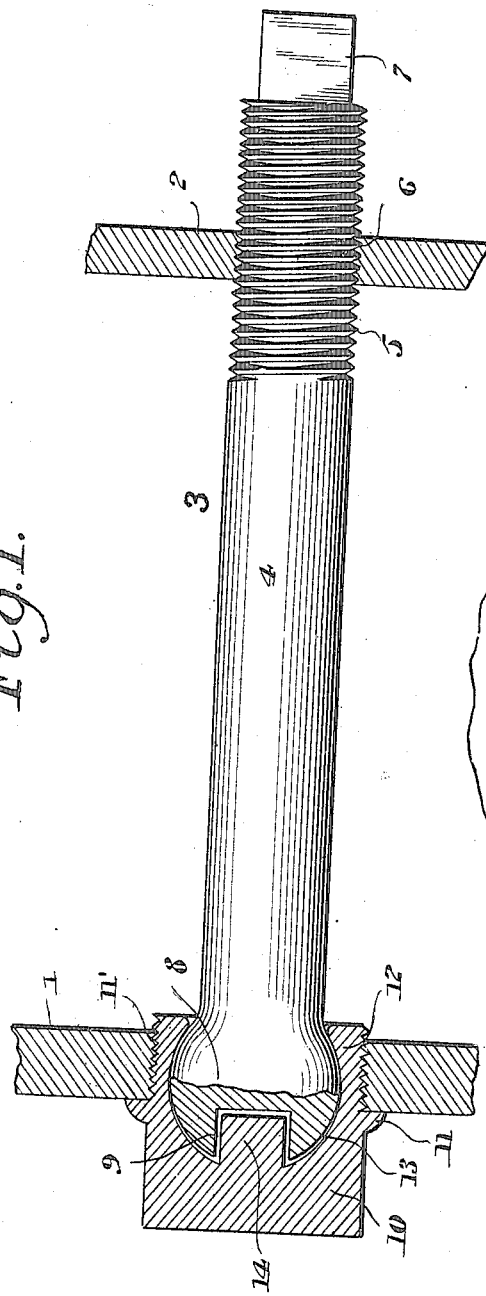
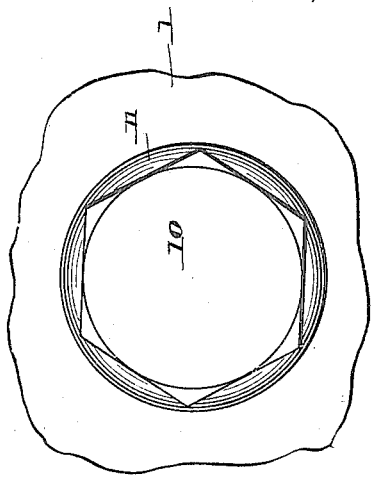
Witnesses
Frederick W. Ely.
Allen F. Stevens.
Inventors
Charles M. Eckland,
D. P. Kellogg.
By Victor J. Evans
Attorney

UNITED STATES PATENT OFFICE.

DANIEL P. KELLOGG, OF LOS ANGELES, AND CHARLES M. ECKLAND, OF STOCKTON, CALIFORNIA.

BOLT.

1,207,562.  Specification of Letters Patent.  Patented Dec. 5, 1916.

Application filed September 4, 1915. Serial No. 49,038.

*To all whom it may concern:*

Be it known that we, DANIEL P. KELLOGG and CHARLES M. ECKLAND, citizens of the United States, residing at Los Angeles and Stockton, respectively, in the counties of Los Angeles and San Joaquin and State of California, have invented new and useful Improvements in Bolts, of which the following is a specification.
The present invention relates to improvements in flexible bolts for locomotive or fire box boilers.

In carrying out our invention we propose to provide a flexible stay bolt having a flexible connection with the outer sheet of a fire box whereby a wide range of flexibility of the bolt is permitted to prevent the breaking of the bolt by the expansion and contraction of the inner sheet or wall of the fire box.
It is also our purpose to connect the inner and outer sheets of a fire box by flexible members so constructed and arranged as to permit of a limited expansion and contraction of the sheets without interfering with any of the connecting bolts as well as to insure a uniform tensional strength upon all of the connecting bolts so that no unequal stress will be applied upon any of the said bolts.
A still further object of the invention is to produce a flexible stay bolt for connecting boiler sheets which comprises two members which include a bolt proper and a cap which engages the head of the said bolt and so arrange the cap upon the bolt as to prevent the same being screwed entirely through the outer plate and to arrange the same so that the center of the head of the bolt proper will at all times be maintained beyond the center of the outer sheet, and the cap so co-acting with the bolt proper in such a manner that the rotation of the said cap will secure and adjust the said bolt proper upon the inner sheet by the simple application of a wrench or the like to the said cap.

It is a still further object of the invention to provide a flexible bolt for connecting or staying sheets of a boiler which shall comprise a bolt member having a round head, and the said head being formed upon its outer face with a central depression, to provide a cap having a socket which wholly receives the head of the bolt but which permits of the said head, at the outer portion thereof, being spaced from the wall of the socket, the said socket being further provided with a central lug which engages within the depression in the head of the bolt, so that by rotating the cap the bolt will be likewise rotated, means being provided upon the cap for preventing the same passing through the threaded opening in the outer sheet, the said means reinforcing the cap and affording a bearing surface for the outer sheet to prevent the bulging thereof at the portions thereof connected by the bolt and also wherein the space between the head of the bolt and the socket of the cap permits of a slight contraction and expansion to equalize the pressure of various bolts which connect the sheets.

With the above and other objects in view, the improvement resides in the construction, combination and arrangement of parts set forth in the following specification and falling within the scope of the appended claim.

In the drawing, Figure 1 is a vertical longitudinal sectional view through the inner and outer sheets of a fire box boiler connected in accordance with the present invention, the cap and a portion of the head of the flexible stay bolt being shown in section, and Fig. 2 is an elevation looking toward the outer sheet. Fig. 3 is a central longitudinal sectional view through the cap member 4 before the threads have been cut thereon to compress the same into bolt engaging position as illustrated in Fig. 1.

Referring now to the drawing in detail, the numeral 1 designates the outer sheet of the fire box and 2 the inner sheet of a boiler fire box, and connecting the said sheets is our improved flexible stay bolt 3. The stay bolt includes a bolt proper, indicated by the numeral 4, the same having one of its ends threaded, as at 5, and engaging with the threaded opening 6 in the inner plate 2, and the end of said bolt beyond its thread 6 is preferably formed with a rectangular extension 7. The opposite end of the bolt is provided with a round or ball-head 8. The said head upon its outer surface is centrally formed with a substantially square depression 9.

The numeral 10 designates the cap member of the stay bolt, the same being formed upon its outer perimeter with a continuous flange or shoulder 11 which is adapted to contact with the outer face of the sheet 1 to limit the inward movement of the cap with relation to the outer sheet 1, and the said outer sheet is provided with a threaded opening 11' to receive the threaded and rounded end 12 of the cap 10. The cap may project a suitable distance beyond the inner face of the outer plate 1, and the same is provided with a spherical-shaped socket 13 within which the head 8 of the bolt is received. The head, it will be noted by reference to Fig. 1 is wholly received within the said socket, so that the center of the head is projected beyond the center of the sheet 1 so that a tension applied to the bolt 4 will only cause the head to expand the inner portion of the cap to force the same more tightly into contact with the threaded opening 11 and further to protect the socket from the free entrance of water thereto so as to prevent the lime and other deposits from the water incrusting or corroding the head of the bolt to cause the same to disintegrate and easily break. By reference to the said Fig. 1, it will be further noted that the outer face of the head 8 of the bolt does not contact with the inner wall of the socket, a "breathing" space being left between the same, and this space is essential for the proper expansion and contraction of the bolt as well as for permitting a proper adjustment of all of the bolts so that none of the said bolts shall exert an unequal tension between the plates 1 and 2, and thus permit of the said plates being properly and equally spaced throughout. The bore of the cap is centrally provided with a lug 14 which is shaped to correspond with the walls provided by the depression 9 and to be received within the said depression. The lug 14 is of a less cross sectional diameter than the area of the depression 9, a slight space being left between the sides of the said lug and the walls of said depression, and also the end of the lug does not contact with the inner wall of the depression, so that the lug cannot interfere with the expansion or contraction of the bolt, but upon rotating the cap the sides of the lug will contact with the walls of the depression to rotate the nut when the bolt and cap are being secured to or detached from the sheets 1 and 2 of the fire box. It will be noted that the lug and the depression are disposed to the exterior of the outer sheet 1 and are thus maintained in a cooler condition than the portions of the bolt passed between the heated water between the sheets. This element is essential for the reason that should the lime or other deposits from the water enter the socket of the cap the cool air from the exterior of the boiler will prevent liming or corroding, leaving the bolt always free and flexible.

As illustrated in Fig. 3 the end of the cap 10 at the open portion or bore thereof is flared outwardly and is adapted to be compressed around the head of the bolt when the said portion is threaded to be passed in the threaded opening in the outer sheet of the fire box plate, or the said flared portion may be forced inwardly to engage with the neck of the spherical shaped head of the bolt 2 after the threads have been applied to the said member 10.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what we claim is:

In combination with the inner and outer sheets for a boiler or the like, of connecting means for the said sheets, said means including a bolt that has a threaded portion engaging a threaded opening in the inner sheet, and a squared end extending beyond the said threaded portion, the other end of the bolt being provided with a spherical head which projects through a threaded opening in the outer sheet and which has its major portion extending beyond the center of the said outer sheet, the said head being centrally formed with a substantially square depression, a cap having a spherical socket receiving the head, and the inner wall of the said socket being spaced from the head, said socket being formed with a projecting square lug which is received within the depression in the bolt head but which is spaced from the walls provided by the said depression, and the said cap having an exterior flange which contacts with the outer face of the outer sheet, all as and for the purpose set forth.

In testimony whereof we affix our signatures in presence of witnesses.

DANIEL P. KELLOGG.
CHARLES M. ECKLAND.

Witnesses:
MERTON L. ENGLISH,
J. C. MCMULLEN,
RICHARD F. TINA,
C. H. METSKER.

Copies of this patent may be obtained for five cents each, by addressing the "Commissioner of Patents, Washington, D. C."